Jan. 29, 1957　　　　C. GILARDI　　　　2,779,322
TORQUE TRANSMITTING DEVICE FOR BICYCLES
PROVIDED WITH AN AUXILIARY ENGINE
Filed Nov. 13, 1953　　　　　　　　3 Sheets-Sheet 3
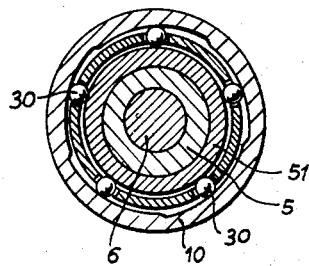
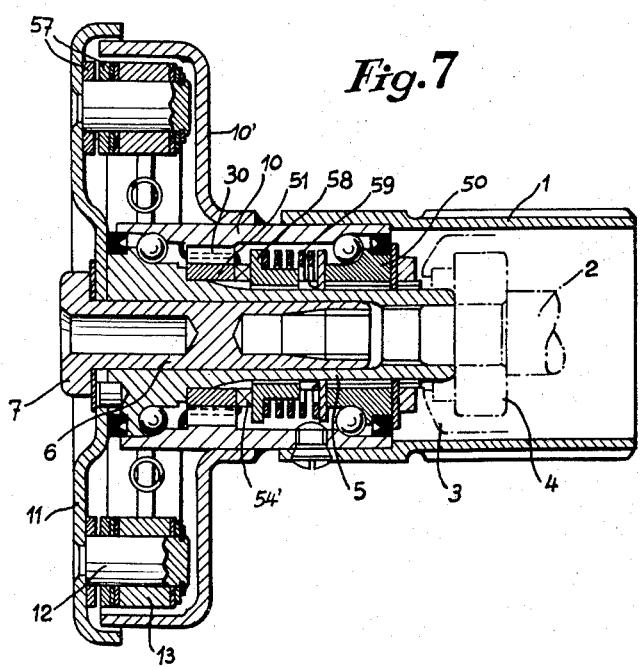

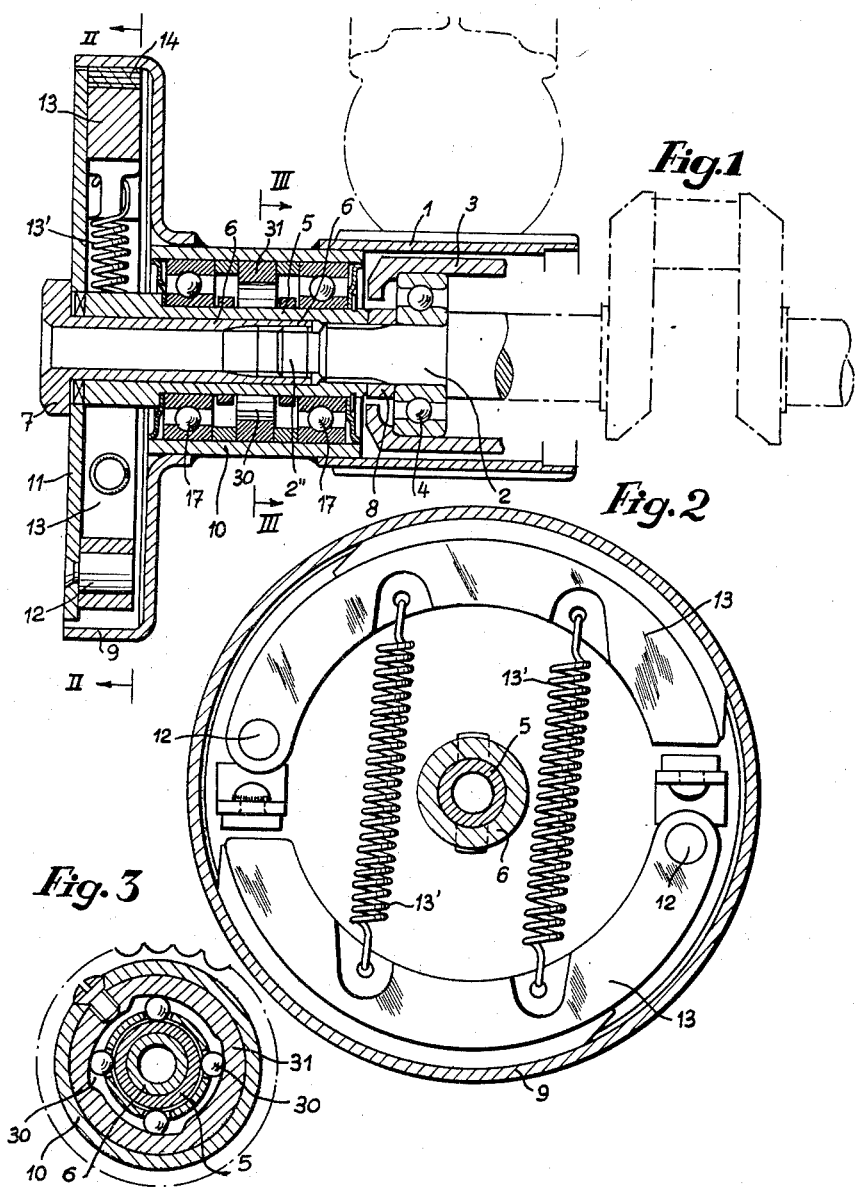

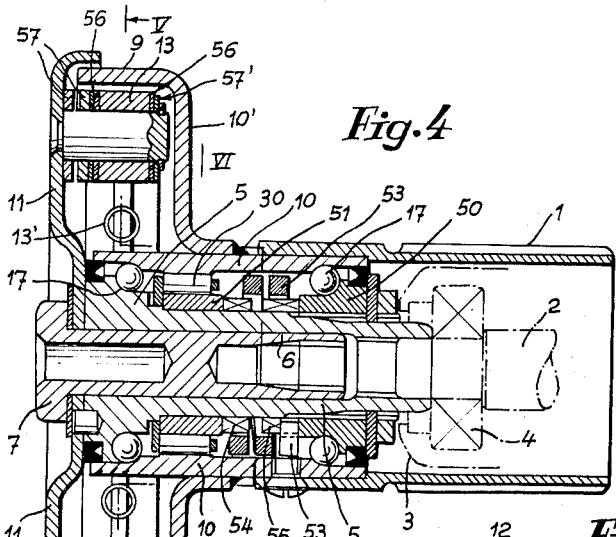
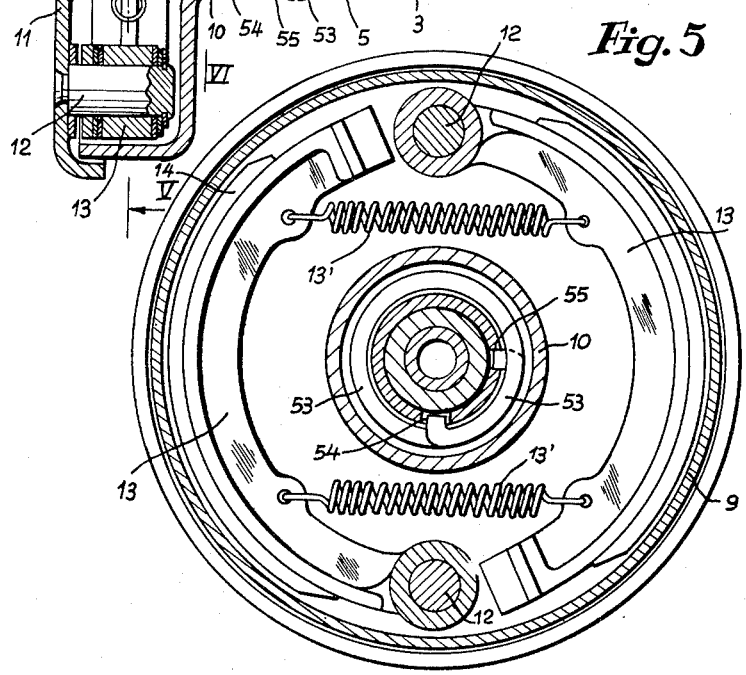

United States Patent Office 2,779,322
Patented Jan. 29, 1957

2,779,322

TORQUE TRANSMITTING DEVICE FOR BICYCLES PROVIDED WITH AN AUXILIARY ENGINE

Carlo Gilardi, Milan, Italy

Application November 13, 1953, Serial No. 392,017

Claims priority, application Italy November 19, 1952

11 Claims. (Cl. 123—179)

This invention relates to improvements in the drive between the engine shaft and member engaging the driving wheel of a motor bicycle and the like, consisting in the arrangement between the end of the engine shaft and said member, of an automatic clutch responsive to the number of revolutions of the engine, by which the engine can be maintained in operation or idle when the vehicle is stationary and the vehicle can be started by simply accelerating the engine, suitable means being provided for starting the engine by means of the pedals or by the movement of the vehicle.

The invention shall be described with reference to the accompanying drawings which show by way of example some embodiments thereof.

Figure 1 is an axial section of the automatic clutch comprising a free wheel by means of which the engine can be started by the pedals or by the movement of the vehicle without any previous manipulation;

Figures 2 and 3 are cross sectional views on lines II—II and III—III of Figure 1;

Figure 4 is an axial section of a modification of Figures 1 to 3;

Figure 5 is a cross sectional view on line V—V of Figure 4 and

Figure 6 is a cross sectional view on line VI—VI of Figure 4;

Figure 7 is an axial section of a modification of Figures 4 to 6.

Referring to Figures 1 to 3 showing the first embodiment, 1 denotes the friction roller adapted to act on the tire of the driving wheel of a motor bicycle, 2 denotes the engine shaft mounted on the cycle frame. On the drawing the outer bearing 4 of the pair of bearings supporting the shaft 2 in the crankcase 3 of the engine is visible.

The shaft 2 is splined to receive the sleeve 5 carrying a disc 11. Centrifugal jaws 13 provided with linings 14 are mounted for oscillation on pivots 12 near the periphery of the disc 11. The jaws 13 act within the drum 9 carried by a sleeve 10 securely fixed to the friction roller 1. The jaws 13 are biassed by springs 13', which are overcome by the centrifugal force only when the engine exceeds a given number of revolutions, the clutch being disconnected during idling.

The sleeve 5 splined to the engine shaft is held in position in an axial direction by the screw having a tubular shank 6 provided at its end with an inner screw thread for screwing it on the screw-threaded end portion 2" of the engine shaft.

The head 7 of the screw 6 axially retains the sleeve 5 on the side of the disc 11 by pushing the sleeve by its end against the spacer 8 bearing in turn against the inner race ring of the bearing 4.

Bearings 17 are interposed between the sleeves 5 and 10 and a free wheel with rollers 30 (Figure 3) is mounted in the clearance between said bearings. The outer race ring 31 of the free wheel carries eccentric rolling tracks for the rollers 30, while the inner cylindrical track is directly formed on the sleeve 5. By the free wheel the engine may be started through the pedals without any previous manipulation.

It will be obvious that the wheel establishes a direct connection between the parts 10 and 5 when the movement of the roller 1 is transmitted on pedal starting on the sleeve 10, hence through the free wheel directly to the sleeve 5 and to the engine shaft. As soon as the engine starts and the sleeve 5 reaches a number of revolutions exceeding the number of revolutions of the sleeve 10, the said connection is released by the free wheel.

Figures 4, 5 and 6 show an improved embodiment employing a resilient joint adapted to absorb sharp shock which would otherwise affect more particularly the inner race ring carrying the cylindrical rolling track for the rollers of the free wheel, said shocks being due for instance to the back-thrusts on stoppage of the engine or for other causes, such as sharp starting etc. Said sharp shocks can spoil the rolling surface of said race ring in a short time, which is more particularly inconvenient with an arrangement as shown in Figure 1, which would make it necessary to replace the whole sleeve 5 to which the said surface appertains.

The inner race ring 51 of the free wheel forms the cylindrical rolling track for the rollers 30, while the eccentric sectors of the free wheel are formed within the sleeve 10 (Figure 6). The ring 51 is not secured to the sleeve 5, with respect to which it can undergo angular displacements which are permitted by a torque helical spring 53, of which the two suitably bent ends are engaged by notches 54, 55, respectively cut in the conveniently extended end of the ring 51 and in one end, facing the former, of an extension of the ring 50 rigidly keyed to the sleeve 5 (Figures 4 and 5). The resilient device described above torsionally absorbs the back-thrust on stoppage of the engine as well as any further stress exceeding normal ones.

Means are further provided in this construction for preventing oscillations of the centrifugal jaws when the angular speed of the engine is about to be reached, which corresponds to the condition for operativeness of the clutch and which gives rise to repeated coupling and uncoupling at the speed, which may be referred to as critical speed, till the latter is definitely exceeded. The said means comprise a friction clutch arranged at the pivot of oscillation of the centrifugal jaws, which absorbs vibrations thereby avoiding the abovementioned drawback.

Shock absorbing means adapted to prevent oscillations of the centrifugal jaws near the critical speed of the clutch, are of the following construction.

A strong helical spring 57 with one or more turns is mounted on the pivots 12 of the jaws 13 and reacts on the disc 11 thereby pressing laterally on the hub of the jaw 13 through the interposition of washers 56 of friction lining, such as for instance fibre. The washers are interposed too on the remote side from the spring 57, between the flank of the hub of the jaw 13 and a metallic washer 57' held in position by a suitable stop engaged by a groove in the ends of the pivot 12 (Figure 4).

In the modification shown in Figure 7, the spring means interposed between the inner race ring of the free wheel and sleeve 5 consists of a helical compression spring 59 having a plurality of windings, replacing the torque spring 53 in the previous construction. For this purpose, a flanged ring 58 slidably mounted on the sleeve 5 is provided.

A compression spring 59 reacts on the inside of the flange 58, which is formed outside with inclined dog teeth arranged in a circular row and cooperating with dog teeth 54' in the ring 51. The device acts as a shock-absorber, as the inclined teeth surfaces slide on one another on a back stroke as the engine stops, compressing the spring which absorbs the shock and permits angular displacements of the ring 51.

It will be understood that the form and constructional details of the device can be modified with respect to the examples given above, within the characteristic features, without departing from the scope of this invention. For instance the dog-teeth clutch may be replaced by a friction clutch or any other means known for this purpose.

What I claim is:

1. In combination with a cycle having an auxiliary engine and a driving member actuated by said engine and engaging a wheel of the cycle, a torque transmitting device between said engine and member comprising an engine shaft, a speed-responsive clutch between the shaft and member, and a one-way connection between the shaft and member for starting the engine from the member.

2. In combination with a cycle having an auxiliary engine and a driving member actuated by said engine and engaging a wheel of the cycle, a torque transmitting device between said engine and member comprising an engine shaft, a speed-responsive clutch between the shaft and member having its driving part coupled with the shaft and a driven part connected with said member, and a one-way clutch transmitting motion from the member to the shaft for starting the engine.

3. In combination with a cycle having an auxiliary engine and a driving member actuated by said engine and engaging a wheel of the cycle, a torque transmitting device between said engine and member comprising an engine shaft, a centrifugal clutch between the shaft and member including a pair of shoes, a shoe-carrying disc and a drum frictionally engageable by said shoes, the disc being coupled with the shaft, the drum being fixedly connected with said member, and a one-way clutch transmitting motion from the member to the shaft for starting the engine.

4. In a device as claimed in claim 3, the driving member and clutch being coaxial with the shaft, an outer sleeve connecting the drum to the member, an inner sleeve connecting the shoe-carrying disc to the shaft, two axially spaced bearings between said two sleeves, the one-way clutch being mounted between said two bearings.

5. In combination with a cycle having an auxiliary engine and a driving member actuated by said engine and engaging a wheel of the cycle, a torque transmitting device between said engine and member comprising an engine shaft having a splined end portion and a threaded extension thereon, an inner sleeve egaging said splined end portion, a centrifugal clutch including a pair of shoes, a shoe-carrying disc and a drum frictionally engageable by said shoes, said disc being fixedly connected with said sleeve, an internally threaded bolt screwed on the threaded extension of the shaft securing the disc and the sleeve to the shaft, an outer sleeve connecting the drum with the driving member, two axially spaced bearings supporting said outer sleeve from the inner sleeve, and a free-wheel transmitting motion from the member to the shaft for starting the engine, said one-way clutch including an inner race directly formed on the inner sleeve.

6. Device as claimed in claim 3, wherein said centrifugal clutch includes a shoe-carrying pivot fixed to said disc, and a friction brake supported by said pivot for damping oscillations of the shoe at the critical speed of the clutch.

7. Device as claimed in claim 1, wherein spring means are provided between the one-way connection and engine shaft for shock-absorbing purposes.

8. In combination with a cycle having an auxiliary engine and a driving member actuated by said engine and engaging a wheel of the cycle, a torque transmitting device between said engine and member comprising an engine shaft having a splined end portion and a threaded extension thereon, an inner sleeve engaging said splined end portion, a centrifugal clutch including a pair of shoes, a shoe-carrying disc and a drum frictionally engageable by said shoes, said disc being fixedly connected with said sleeve, an internally threaded bolt screwed on the threaded extension of the shaft securing the disc and the sleeve to the shaft, an outer sleeve connecting the drum to the driving member, a one-way clutch transmitting motion from the outer to the inner sleeve for starting the engine, said one-way clutch having its inner race-ring loose on the inner sleeve, and a torsional shock-absorber connecting said race-ring to the inner sleeve.

9. Device according to claim 8, wherein said torsional shock-absorber comprises a flanged ring loose on the inner sleeve, inclined dog-teeth on the inner race-ring, inclined dog-teeth on said flanged ring facing and cooperating with said first-mentioned dog-teeth, and a helical compression spring urging said flanged ring towards said race-ring.

10. Device according to claim 8, wherein said torsional shock-absorber comprises a flanged ring loose on the inner sleeve, cooperating friction surfaces on said flanged ring and the inner race-ring, and a helical compression spring urging said flanged ring towards said race-ring.

11. Device as claimed in claim 3, wherein said centrifugal clutch includes a shoe-carrying pivot fixed to said disc, a hub on the shoe rotatable on said pivot, at least one friction washer supported by the pivot between the hub and disc, spring means urging the washer against the hub, a stop at a free end of the pivot, a metallic washer abutting against the stop, and a friction washer between the hub and said metallic washer.

References Cited in the file of this patent

UNITED STATES PATENTS

| | | |
|---|---|---|
| 1,080,642 | MacFarland | Dec. 9, 1913 |
| 2,031,881 | Evinrude | Feb. 25, 1936 |